(12) United States Patent
Wittmer et al.

(10) Patent No.: US 7,983,962 B2
(45) Date of Patent: Jul. 19, 2011

(54) METHOD AND SYSTEM FOR PURCHASE ORDER DATA ENTRY

(75) Inventors: Holger Wittmer, Völklingen (DE); Michael Biwer, Lauterbach (DE); Andreas Freitag, Saarbrücken (DE); Michael Haase, Bous (DE)

(73) Assignee: SAP Aktiengesellschaft, Walldorf (DE)

( * ) Notice: Subject to any disclaimer, the term of this patent is extended or adjusted under 35 U.S.C. 154(b) by 82 days.

(21) Appl. No.: 11/074,368

(22) Filed: Mar. 7, 2005

(65) Prior Publication Data

US 2006/0015417 A1 Jan. 19, 2006

Related U.S. Application Data

(60) Provisional application No. 60/551,221, filed on Mar. 8, 2004, provisional application No. 60/563,284, filed on Apr. 16, 2004.

(51) Int. Cl.
*G06Q 30/00* (2006.01)
(52) U.S. Cl. ............... 705/26.8; 705/26.1; 705/26.81; 705/26.82; 705/27.1
(58) Field of Classification Search .............. 705/26, 705/27
See application file for complete search history.

(56) References Cited

U.S. PATENT DOCUMENTS

| | | | |
|---|---|---|---|
| 4,750,119 A | 6/1988 | Cohen et al. | |
| 4,752,877 A | 6/1988 | Roberts et al. | |
| 5,297,250 A | 3/1994 | Leroy et al. | |
| 5,315,508 A | 5/1994 | Bain et al. | |
| 5,325,304 A | 6/1994 | Aoki | |
| 5,400,253 A | 3/1995 | O'Connor | |
| 5,500,513 A | 3/1996 | Langhans et al. | |
| 5,615,109 A | 3/1997 | Eder | |
| 5,621,201 A | 4/1997 | Langhans et al. | |
| 5,710,578 A | 1/1998 | Beauregard et al. | |
| 5,758,327 A | 5/1998 | Gardner et al. | |
| H1743 H | 8/1998 | Graves et al. | |
| 5,796,614 A | 8/1998 | Yamada | |

(Continued)

FOREIGN PATENT DOCUMENTS

JP 2004-30343 A 1/2004

(Continued)

OTHER PUBLICATIONS

"A Review of state procurement and contracting" John R Bartle; Ronnie LaCourse Korosec. Journal of Public Procurement; 2003. <Previously included and cited by applicant on IDS dated Aug. 24, 2010>.*

(Continued)

*Primary Examiner* — Michael A. Misiaszek
(74) *Attorney, Agent, or Firm* — Foley & Lardner LLP

(57) ABSTRACT

A method of entering purchase order data includes receiving first data associated with an item. The first data comprises data entered by a user using a graphical user interface associated with a computerized purchasing system for at least one of products and services. The method also includes transferring the first data to a purchase order list in response to a single user input command facilitated by the graphical user interface, and displaying the first data and second data associated with the item as a purchase order list line item in the purchase order list using the graphical user interface in response to the single user input command. The second data includes at least one of data stored in the computerized purchasing system and data generated by the computerized purchasing system based on the first data.

12 Claims, 6 Drawing Sheets

U.S. PATENT DOCUMENTS

| | | |
|---|---|---|
| 5,832,496 A | 11/1998 | Anand et al. |
| 5,870,716 A | 2/1999 | Sugiyama et al. |
| 5,878,400 A | 3/1999 | Carter |
| 5,920,846 A | 7/1999 | Storch et al. |
| 5,930,769 A | 7/1999 | Rose |
| 5,930,771 A | 7/1999 | Stapp |
| 5,943,652 A | 8/1999 | Sisley et al. |
| 5,953,707 A | 9/1999 | Huang et al. |
| 5,999,914 A | 12/1999 | Blinn et al. |
| 6,014,648 A | 1/2000 | Brennan |
| 6,029,139 A | 2/2000 | Cunningham et al. |
| 6,064,984 A | 5/2000 | Ferguson et al. |
| 6,115,690 A | 9/2000 | Wong |
| 6,151,588 A | 11/2000 | Tozzoli et al. |
| 6,185,550 B1 | 2/2001 | Snow et al. |
| 6,260,024 B1 | 7/2001 | Shkedy |
| 6,285,916 B1 | 9/2001 | Kadaba et al. |
| 6,341,351 B1 | 1/2002 | Muralidhran et al. |
| 6,366,890 B1 | 4/2002 | Usrey |
| 6,473,794 B1 | 10/2002 | Guheen et al. |
| 6,484,149 B1 | 11/2002 | Jammes et al. |
| 6,505,093 B1 | 1/2003 | Thatcher et al. |
| 6,507,851 B1 | 1/2003 | Fugiwara et al. |
| 6,647,380 B1 | 11/2003 | Yotsukura |
| 6,671,676 B1 | 12/2003 | Shacham |
| 6,701,299 B2 | 3/2004 | Kraisser et al. |
| 6,721,715 B2 | 4/2004 | Nemzow |
| 6,725,204 B1 | 4/2004 | Gusley |
| 6,868,528 B2 | 3/2005 | Roberts |
| 6,910,017 B1 | 6/2005 | Woo et al. |
| 6,980,966 B1 | 12/2005 | Sobrado et al. |
| 7,016,859 B2 | 3/2006 | Whitesage |
| 7,080,030 B2 | 7/2006 | Eglen et al. |
| 7,082,408 B1 | 7/2006 | Baumann et al. |
| 7,082,426 B2 | 7/2006 | Musgrove et al. |
| 7,092,929 B1 | 8/2006 | Dvorak et al. |
| 7,096,189 B1 | 8/2006 | Srinivasan |
| 7,107,268 B1 | 9/2006 | Zawadzki et al. |
| 7,117,165 B1 | 10/2006 | Adams et al. |
| 7,124,098 B2 | 10/2006 | Hopson et al. |
| 7,124,984 B2 | 10/2006 | Yokouchi et al. |
| 7,139,731 B1 | 11/2006 | Alvin |
| 7,188,080 B1 | 3/2007 | Walker et al. |
| 7,216,086 B1 | 5/2007 | Grosvenor et al. |
| 7,283,975 B2 | 10/2007 | Broughton |
| 7,343,315 B2 | 3/2008 | Wittmer et al. |
| 7,346,656 B2 | 3/2008 | Worthen |
| 7,499,877 B2 | 3/2009 | Carr et al. |
| 7,516,083 B1 | 4/2009 | Dvorak et al. |
| 7,523,048 B1 | 4/2009 | Dvorak |
| 2001/0011295 A1 | 8/2001 | Kobayashi et al. |
| 2001/0013731 A1 | 8/2001 | Shinohara et al. |
| 2001/0019332 A1* | 9/2001 | Fisher ............................ 345/582 |
| 2001/0019778 A1 | 9/2001 | Gardaz et al. |
| 2001/0032130 A1 | 10/2001 | Gabos et al. |
| 2001/0034673 A1 | 10/2001 | Yang et al. |
| 2001/0039517 A1 | 11/2001 | Kawakatsu |
| 2001/0049634 A1 | 12/2001 | Stewart |
| 2002/0012390 A1 | 1/2002 | Kim |
| 2002/0013731 A1 | 1/2002 | Bright et al. |
| 2002/0019778 A1 | 2/2002 | Isaacson et al. |
| 2002/0023500 A1 | 2/2002 | Chikuan et al. |
| 2002/0026368 A1 | 2/2002 | Carter |
| 2002/0048369 A1 | 4/2002 | Ginter et al. |
| 2002/0059108 A1 | 5/2002 | Okura et al. |
| 2002/0059122 A1 | 5/2002 | Inoue et al. |
| 2002/0062314 A1 | 5/2002 | Hisasue et al. |
| 2002/0072986 A1 | 6/2002 | Aram |
| 2002/0073114 A1 | 6/2002 | Nicastro et al. |
| 2002/0078159 A1 | 6/2002 | Petrogiannis et al. |
| 2002/0099563 A1 | 7/2002 | Adendorff et al. |
| 2002/0099579 A1 | 7/2002 | Stowell et al. |
| 2002/0107713 A1 | 8/2002 | Hawkins |
| 2002/0116241 A1 | 8/2002 | Sandhu et al. |
| 2002/0120523 A1 | 8/2002 | Yang |
| 2002/0120533 A1 | 8/2002 | Wiesenmaier |
| 2002/0123930 A1 | 9/2002 | Boyd et al. |
| 2002/0128946 A1 | 9/2002 | Chehade et al. |
| 2002/0138290 A1 | 9/2002 | Metcalfe et al. |
| 2002/0138360 A1 | 9/2002 | Inoue et al. |
| 2002/0143644 A1 | 10/2002 | Tosun et al. |
| 2002/0143690 A1 | 10/2002 | Mahajan et al. |
| 2002/0147622 A1 | 10/2002 | Drolet et al. |
| 2002/0147668 A1 | 10/2002 | Smith et al. |
| 2002/0152128 A1 | 10/2002 | Walch et al. |
| 2002/0156858 A1 | 10/2002 | Hunter |
| 2002/0165782 A1 | 11/2002 | Falkenstein et al. |
| 2002/0184116 A1 | 12/2002 | Tam et al. |
| 2002/0188524 A1 | 12/2002 | Shimizu |
| 2003/0023500 A1 | 1/2003 | Boies et al. |
| 2003/0028393 A1 | 2/2003 | Coulston et al. |
| 2003/0028437 A1 | 2/2003 | Grant et al. |
| 2003/0033231 A1 | 2/2003 | Turner et al. |
| 2003/0046120 A1 | 3/2003 | Hoffman et al. |
| 2003/0046195 A1 | 3/2003 | Mao |
| 2003/0050852 A1 | 3/2003 | Liao et al. |
| 2003/0065574 A1 | 4/2003 | Lawrence |
| 2003/0074269 A1 | 4/2003 | Viswanath |
| 2003/0083961 A1 | 5/2003 | Bezos et al. |
| 2003/0120528 A1 | 6/2003 | Kruk et al. |
| 2003/0126024 A1 | 7/2003 | Crampton et al. |
| 2003/0128392 A1 | 7/2003 | O'Brien et al. |
| 2003/0144916 A1 | 7/2003 | Mumm et al. |
| 2003/0149631 A1 | 8/2003 | Crampton et al. |
| 2003/0149674 A1 | 8/2003 | Good et al. |
| 2003/0158791 A1* | 8/2003 | Gilberto et al. .................. 705/27 |
| 2003/0171998 A1 | 9/2003 | Pujar et al. |
| 2003/0172007 A1 | 9/2003 | Helmolt et al. |
| 2003/0187767 A1 | 10/2003 | Crites et al. |
| 2003/0200150 A1 | 10/2003 | Westcott et al. |
| 2003/0200156 A1 | 10/2003 | Roseman et al. |
| 2003/0200168 A1 | 10/2003 | Cullen, III et al. |
| 2003/0208365 A1* | 11/2003 | Avery et al. ...................... 705/1 |
| 2003/0229502 A1 | 12/2003 | Woo |
| 2003/0236721 A1 | 12/2003 | Plumer et al. |
| 2004/0006522 A1 | 1/2004 | Keane et al. |
| 2004/0010463 A1 | 1/2004 | Hahn-Carlson et al. |
| 2004/0015367 A1 | 1/2004 | Nicastro et al. |
| 2004/0019528 A1 | 1/2004 | Broussard et al. |
| 2004/0098358 A1 | 5/2004 | Roediger |
| 2004/0122689 A1 | 6/2004 | Dailey et al. |
| 2004/0158507 A1 | 8/2004 | Meek, Jr. et al. |
| 2004/0162763 A1 | 8/2004 | Hoskin et al. |
| 2004/0172321 A1 | 9/2004 | Vemula et al. |
| 2004/0186763 A1 | 9/2004 | Smith |
| 2004/0186765 A1 | 9/2004 | Kataoka |
| 2004/0186783 A1 | 9/2004 | Knight et al. |
| 2004/0210489 A1 | 10/2004 | Jackson et al. |
| 2004/0220861 A1 | 11/2004 | Morciniec et al. |
| 2004/0249722 A1 | 12/2004 | Sugamura et al. |
| 2004/0267674 A1 | 12/2004 | Feng et al. |
| 2005/0015303 A1 | 1/2005 | Dubin et al. |
| 2005/0055283 A1* | 3/2005 | Zarovinsky ...................... 705/26 |
| 2005/0060270 A1 | 3/2005 | Ramakrishnan |
| 2005/0075915 A1 | 4/2005 | Clarkson |
| 2005/0075941 A1 | 4/2005 | Jetter et al. |
| 2005/0086122 A1 | 4/2005 | Cirulli et al. |
| 2005/0086125 A1 | 4/2005 | Cirulli et al. |
| 2005/0096122 A1 | 5/2005 | Nireki et al. |
| 2005/0096125 A1 | 5/2005 | LeMay et al. |
| 2005/0096963 A1 | 5/2005 | Myr et al. |
| 2005/0102175 A1 | 5/2005 | Dudat et al. |
| 2005/0102192 A1 | 5/2005 | Gerrits et al. |
| 2005/0102227 A1 | 5/2005 | Solonchev |
| 2005/0131807 A1 | 6/2005 | Schaefer et al. |
| 2005/0165659 A1* | 7/2005 | Gruber ............................ 705/26 |
| 2005/0171825 A1 | 8/2005 | Denton et al. |
| 2005/0197912 A1 | 9/2005 | Wittmer et al. |
| 2005/0197913 A1 | 9/2005 | Grendel et al. |
| 2005/0197914 A1 | 9/2005 | Welter et al. |
| 2005/0197915 A1 | 9/2005 | Biwer et al. |
| 2005/0197918 A1 | 9/2005 | Wittmer et al. |
| 2005/0197921 A1 | 9/2005 | Abo-Hasna et al. |
| 2005/0197949 A1 | 9/2005 | Welter et al. |
| 2005/0203813 A1 | 9/2005 | Welter et al. |
| 2005/0216325 A1 | 9/2005 | Ziad et al. |
| 2005/0216357 A1 | 9/2005 | Wittmer et al. |

| | | | |
|---|---|---|---|
| 2005/0216359 A1 | 9/2005 | Welter et al. |
| 2005/0216375 A1 | 9/2005 | Grendel et al. |
| 2005/0235020 A1 | 10/2005 | Gabelmann et al. |
| 2005/0240488 A1 | 10/2005 | Grendel et al. |
| 2005/0243792 A1 | 11/2005 | Simon et al. |
| 2005/0246482 A1 | 11/2005 | Gabelmann et al. |
| 2005/0251734 A1 | 11/2005 | Gabelmann et al. |
| 2006/0020512 A1 | 1/2006 | Lucas et al. |
| 2006/0036507 A1 | 2/2006 | Pujar et al. |
| 2006/0074746 A1 | 4/2006 | Kline et al. |
| 2006/0074747 A1 | 4/2006 | Kline et al. |
| 2006/0074748 A1 | 4/2006 | Kline et al. |
| 2006/0074749 A1 | 4/2006 | Kline et al. |
| 2006/0074751 A1 | 4/2006 | Kline et al. |
| 2006/0112099 A1 | 5/2006 | Musgrove et al. |
| 2006/0184401 A1 | 8/2006 | DelGaudio et al. |
| 2007/0050272 A1 | 3/2007 | Godlewski et al. |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

U.S. Appl. No. 60/374,892, filed Apr. 22, 2002, Krajec, Russell.
Anon., "(A lot of) life after H. Ross: Electronic Data Systems", *Financial World*, vol. 162, No. 22, Nov. 9, 1993 (p. 50 (2)).
Author unknown, "Staffware: Staffawre and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001 (p. 1.).
"Beyond Markdown Management", summer/autumn 03, *the 4caster*, Iss. 4, vol. 2.
Brown, Timothy Charles, "The Effects of Assortment Composition Flexibility on Operating Efficiency", (Abstract Only), *Dissertation Abstracts International*, vol. 55/08-A, available at least by 1994, (p. 2458).
Melcher, Rachel, "Local tech firm creates retail markdown tool", Mar. 24, 2000, *Cincinnati Business Courier* (3 pgs.).
Profitlogic, available at http://web.archive.org/web/2002060311838/, available at least by Apr. 15, 2005 (22 pp.).
"Retailers Manage Markdown Challenges Using i2 Solutions", Jan. 13, 2003, NFR 92nd Annual Convention & Expo (2 pgs.).
Subrahmanyan et al., "Developing optimal pricing and inventory policies for retailers who face uncertain demand", *Journal of Retailing*, vol. 72, No. 1, Spring, 1996 (p. 7(24)).
Wilson, Glenn T., "Changing the process of production", *Industrial Management*, vol. 37, No. 1, Jan./Feb. 1995 (pp. 1-2).
Abraham et al., "An Implemented System for Improving Promotion Productivity Using Store Scanner Data", Marketing Science, Summer 1993, vol. 12, No. 3, pp. 248-269.
Kelkar et al., Price Modeling in Standards for Electronic Product Catalogs Based on XML, 2002, pp. 366-375.
Srinivasan et al., Concepts and strategy guidelines for designing value enhancing sales promotions, Journal of Product and Brand Management, vol. 7, No. 5, 1998, pp. 410-420.
"New Pegasystems Enterprise Application Provides Central Hub for Proactively Managing Operational Exceptions," Business Wire, (recovered from Dialog database), Feb. 3, 2004, 4 pages.
Bartle et al., "A Review of State Procurement and Contracting," Journal of Public Procurement, 2003, vol. 3, Issue 2, pp. 192-214 (23 pages total).
Camas, "APS System Integration: More Challenges [Advanced Planned & Scheduling]," Materials Management and Distribution, Jan. 2001, 2 pages.
Chen et al., "Near-Optimal Pricing and Replenishment Strategies for a Retail/Distribution System," Operations Research, Nov./Dec. 2001, vol. 49, No. 6, pp. 839-853 (17 pages total).
Chen et al., "Quantity and Due Date Quoting Available to Promise," Information Systems Frontier, Dec. 2001, vol. 3, No. 4, pp. 477-488 (12 pages total).
Goodwin, "The Open-to-Buy System and Accurate Performance Measurement," International Journal of Retail & Distribution Management, Mar./Apr. 1992, vol. 20, Iss. 2, 7 pages.
Jensen et al., "Long-Term Construction Contracts: the Impact of Tamra '88 on Revenue Recognition," Journal of Construction Education, Spring 1997, vol. 2, No. 1, pp. 37-53 (17 pages total).
Notice of Allowance for U.S. Appl. No. 10/903,867, mail date Feb. 17, 2010, 6 pages.
Notice of Allowance for U.S. Appl. No. 10/914,614, mail date Oct. 3, 2007, 9 pages.
Notice of Allowance for U.S. Appl. No. 10/914,614, mail date Jan. 25, 2008, 7 pages.
Notice of Allowance for U.S. Appl. No. 10/932,913, mail date Nov. 16, 2009, 17 pages.
Notice of Allowance for U.S. Appl. No. 10/932,913, mail date Sep. 30, 2009, 26 pages.
Notice of Allowance for U.S. Appl. No. 10/933,127, mail date Feb. 4, 2010, 11 pages.
Notice of Allowance for U.S. Appl. No. 11/071,982, mail date Aug. 10, 2009, 15 pages.
Notice of Allowance for U.S. Appl. No. 11/075,391, mail date Aug. 31, 2009, 18 pages.
Office Action for U.S. Appl. No. 10/903,902, mail date Aug. 7, 2008, 8 pages.
Office Action for U.S. Appl. No. 10/903,467, mail date Feb. 3, 2010, 16 pages.
Office Action for U.S. Appl. No. 10/903,467, mail date Jan. 26, 2009, 17 pages.
Office Action for U.S. Appl. No. 10/903,467, mail date Jul. 23, 2009, 17 pages.
Office Action for U.S. Appl. No. 10/903,467, mail date Jun. 11, 2008, 15 pages.
Office Action for U.S. Appl. No. 10/903,467, mail date Mar. 27, 2007, 11 pages.
Office Action for U.S. Appl. No. 10/903,867, mail date Aug. 19, 2008, 10 pages.
Office Action for U.S. Appl. No. 10/903,867, mail date Feb. 25, 2008, 9 pages.
Office Action for U.S. Appl. No. 10/903,867, mail date Mar. 16, 2009, 9 pages.
Office Action for U.S. Appl. No. 10/903,867, mail date Oct. 7, 2009, 9 pages.
Office Action for U.S. Appl. No. 10/903,902, mail date Apr. 23, 2008, 9 pages.
Office Action for U.S. Appl. No. 10/903,902, mail date Feb. 12, 2009, 2 pages.
Office Action for U.S. Appl. No. 10/903,902, mail date Mar. 22, 2007, 7 pages.
Office Action for U.S. Appl. No. 10/903,902, mail date Sep. 13, 2007, 8 pages.
Office Action for U.S. Appl. No. 10/915,263, mail date Apr. 12, 2010, 14 pages.
Office Action for U.S. Appl. No. 10/915,263, mail date Apr. 14, 2009, 12 pages.
Office Action for U.S. Appl. No. 10/915,263, mail date Apr. 28, 2008, 16 pages.
Office Action for U.S. Appl. No. 10/915,263, mail date Jul. 23, 2007, 15 pages.
Office Action for U.S. Appl. No. 10/915,263, mail date Sep. 12, 2008, 11 pages.
Office Action for U.S. Appl. No. 10/915,263, mail date Sep. 9, 2009, 13 pages.
Office Action for U.S. Appl. No. 10/915,707, mail date Apr. 13, 2009, 6 pages.
Office Action for U.S. Appl. No. 10/915,707, mail date Apr. 21, 2006, 9 pages.
Office Action for U.S. Appl. No. 10/915,707, mail date Aug. 28, 2006, 13 pages.
Office Action for U.S. Appl. No. 10/915,707, mail date Dec. 8, 2008, 5 pages.
Office Action for U.S. Appl. No. 10/915,707, mail date Mar. 16, 2010, 13 pages.
Office Action for U.S. Appl. No. 10/915,707, mail date Mar. 28, 2007, 13 pages.
Office Action for U.S. Appl. No. 10/915,707, mail date May 1, 2008, 14 pages.

Office Action for U.S. Appl. No. 10/915,707, mail date Sep. 14, 2009, 11 pages.
Office Action for U.S. Appl. No. 10/932,913, mail date Apr. 1, 2009, 15 pages.
Office Action for U.S. Appl. No. 10/932,913, mail date Aug. 27, 2007, 14 pages.
Office Action for U.S. Appl. No. 10/932,913, mail date Jan. 23, 2007, 15 pages.
Office Action for U.S. Appl. No. 10/932,913, mail date Mar. 20, 2008, 14 pages.
Office Action for U.S. Appl. No. 10/932,913, mail date Nov. 16, 2009, 17 pages.
Office Action for U.S. Appl. No. 10/932,913, mail date Sep. 17, 2008, 14 pages.
Office Action for U.S. Appl. No. 10/933,127, mail date Aug. 3, 2009, 26 pages.
Office Action for U.S. Appl. No. 10/933,127, mail date Jul. 16, 2008, 10 pages.
Office Action for U.S. Appl. No. 10/933,127, mail date Jul. 3, 2007, 5 pages.
Office Action for U.S. Appl. No. 10/933,127, mail date Nov. 28, 2007, 7 pages.
Office Action for U.S. Appl. No. 10/981,384, mail date Apr. 29, 2009, 10 pages.
Office Action for U.S. Appl. No. 10/981,384, mail date Mar. 14, 2008, 7 pages.
Office Action for U.S. Appl. No. 10/981,384, mail date Nov. 23, 2009, 10 pages.
Office Action for U.S. Appl. No. 10/981,384, mail date Oct. 16, 2008, 7 pages.
Office Action for U.S. Appl. No. 11/047,368, mail date Dec. 20, 2007, 15 pages.
Office Action for U.S. Appl. No. 11/047,368, mail date Jul. 24, 2008, 18 pages.
Office Action for U.S. Appl. No. 11/047,368, mail date Jun. 26, 2007, 14 pages.
Office Action for U.S. Appl. No. 11/047,368, mail date Mar. 4, 2009, 16 pages.
Office Action for U.S. Appl. No. 11/047,368, mail date Nov. 10, 2009, 14 pages.
Office Action for U.S. Appl. No. 11/071,982, mail date Feb. 13, 2009, 18 pages.
Office Action for U.S. Appl. No. 11/071,982, mail date Jan. 25, 2008, 19 pages.
Office Action for U.S. Appl. No. 11/071,982, mail date May 29, 2008, 20 pages.
Office Action for U.S. Appl. No. 11/071,982, mail date Nov. 18, 2008, 7 pages.
Office Action for U.S. Appl. No. 11/072,000 mail date Jul. 17, 2008, 6 pages.
Office Action for U.S. Appl. No. 11/072,000, mail date Dec. 9, 2008, 10 pages.
Office Action for U.S. Appl. No. 11/072,000, mail date Jun. 11, 2009, 13 page.
Office Action for U.S. Appl. No. 11/072,000, mail date Nov. 12, 2009, 9 pages.
Office Action for U.S. Appl. No. 11/074,600, mail date Feb. 18, 2009, 25 pages.
Office Action for U.S. Appl. No. 11/074,600, mail date Feb. 3, 2010, 29 pages.
Office Action for U.S. Appl. No. 11/074,600, mail date Jul. 16, 2009, 27 pages.
Office Action for U.S. Appl. No. 11/074,600, mail date Sep. 8, 2008, 13 pages.
Office Action for U.S. Appl. No. 11/075,391, mail date Apr. 8, 2008, 5 pages.
Office Action for U.S. Appl. No. 11/075,391, mail date Dec. 11, 2008, 9 pages.
Office Action for U.S. Appl. No. 11/075,391, mail date May 22, 2009, 9 pages.
Office Action for U.S. Appl. No. 11/075,392, mail date Apr. 8, 2008, 14 pages.
Office Action for U.S. Appl. No. 11/075,392, mail date Dec. 9, 2009, 13 pages.
Office Action for U.S. Appl. No. 11/075,392, mail date May 12, 2009, 13 pages.
Office Action for U.S. Appl. No. 11/075,392, mail date Nov. 13, 2008, 15 pages.
Office Action for U.S. Appl. No. 11/075,393, mail date Jun. 11, 2009, 26 pages.
Office Action for U.S. Appl. No. 11/075,393, mail date May 28, 2008, 9 pages
Office Action for U.S. Appl. No. 11/075,393, mailed Nov. 24, 2009, 24 pages.
Saad et al, "An Integrated Model for Order Release and Due-Date Demand Management," Journal of Manufacturing Technology Management, 2004, vol. 15, No. 1, 14 pages.
Staib et al., "Purchasing and Supply Chain Management," Air Force Journal of Logistics, Fall 2002, vol. 26, No. 3, 9 pages.
Notice of Allowance for U.S. Appl. No. 10/903,867, mail date May 27, 2010, 6 pages.
Notice of Allowance for U.S. Appl. No. 10/903,467, mail date Aug. 11, 2010, 4 pages.
Notice of Allowance for U.S. Appl. No. 11/072,000, mail date Jul. 9, 2010, 12 pages.
Notice of Allowance for U.S. Appl. No. 11/075,393, mail date Jun. 10, 2010, 8 pages.
Office Action for U.S. Appl. No. 11/047,368, mail date Jun. 16, 2010, 12 pages.
Office Action for U.S. Appl. No. 11/047,368, mail date Nov. 24, 2010, 11 pages.
Office Action for U.S. Appl. No. 11/074,368, mail date Aug. 31, 2010, 12 pages.
Office Action for U.S. Appl. No. 11/074,600, mail date Nov. 26, 2010, 27 pages.
Office Action for U.S. Appl. No. 11/075,392, mail date Aug. 4, 2010, 15 pages.

* cited by examiner

FIG. 5

METHOD AND SYSTEM FOR PURCHASE ORDER DATA ENTRY

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND

The present description relates generally to the field of generating and managing purchase orders. More particularly, the present description relates to a method and system for entering purchase order data.

The retail business can require that certain purchase orders be processed in a very short amount of time, while other purchase orders must be placed in advance of the desired delivery. For example, changes in current trends in the fashion industry may require that inventory be increased on short notice. Additionally, fashion articles may require ordering well in advance of delivery, in some cases six months or more in advance. For certain aspects of the fashion industry, items may be required to be ordered one or more seasons in advance. An advantageous purchase order system must accommodate this variation in lead times of the ordered items without unnecessarily tying up funds.

Further, tracking inventory and budgets for seasonal items can be important to the profitability of a business. For example, identifying a particularly fast selling item and ordering additional quantities to arrive on time and within a prescribed budget may increase the profitability of a retail location. Accordingly, it is important for a business to carefully plan and schedule purchasing orders for retail products and services to ensure on-time procurement or scheduling within budget constraints. Optimizing the smooth flow of the procurement process increases an enterprise's efficiency and competitiveness and determines its success.

As part of the procurement process, retail businesses and service providers often need to manually enter large amounts of data into the purchase order system. For example, in order to generate a purchase order, a significant amount of detailed information may need to be entered or determined for each line item in the purchase order. Some of this information may have been previously entered into the purchase order system in different locations, and may need to be consolidated into a single document in order to determine certain parameters, such as quantities, dates, and prices, before generating the purchase order. Manually entering or retrieving this data may become highly repetitive, may further require frequent changes between data entry devices (e.g., switching between keyboard and mouse), and may require a large number of user input commands. There is need for a method and system for purchase order data entry that may provide more efficient manual entry of purchase order data.

SUMMARY

According to an exemplary embodiment, a method of entering purchase order data includes receiving first data associated with an item. The first data comprises data entered by a user using a graphical user interface associated with a computerized purchasing system for at least one of products and services. The method also includes transferring the first data to a purchase order list in response to a single user input command facilitated by the graphical user interface, and displaying the first data and second data associated with the item as a purchase order list line item in the purchase order list using the graphical user interface in response to the single user input command. The second data includes at least one of data stored in the computerized purchasing system and data generated by the computerized purchasing system based on the first data.

According to another exemplary embodiment, a purchasing system includes means for receiving first data associated with an item. The first data comprises data entered by a user using a graphical user interface associated with a computerized purchasing system for at least one of products and services. The purchasing system also includes means for transferring the first data to a purchase order list in response to a single user input command facilitated by the graphical user interface, and means for displaying the first data and second data associated with the item as a purchase order list line item in the purchase order list using the graphical user interface in response to the single user input command. The second data includes at least one of data stored in the computerized purchasing system and data generated by the computerized purchasing system based on the first data.

According to another exemplary embodiment, a program product for facilitating purchase order data entry includes machine-readable program code for causing, when executed, one or more machines to perform the method steps of receiving first data associated with an item, wherein the first data comprises data entered by a user using a graphical user interface associated with a computerized purchasing system for at least one of products and services, transferring the first data to a purchase order list in response to a single user input command facilitated by the graphical user interface, and displaying the first data and second data associated with the item as a purchase order list line item in the purchase order list using the graphical user interface in response to the single user input command. The second data includes at least one of data stored in the computerized purchasing system and data generated by the computerized purchasing system based on the first data.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 5 illustrates a screen configured to facilitate selection of single or multiple items for manual data entry from a predetermined list of items according to an exemplary embodiment.

DETAILED DESCRIPTION

In the following description, for the purposes of explanation, numerous details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments. Further, while the method and system is described primarily in the context of retail management systems for retail products and articles, it should be understood that the method and system are applicable in other contexts, including management systems for service providers.

Figure 1:
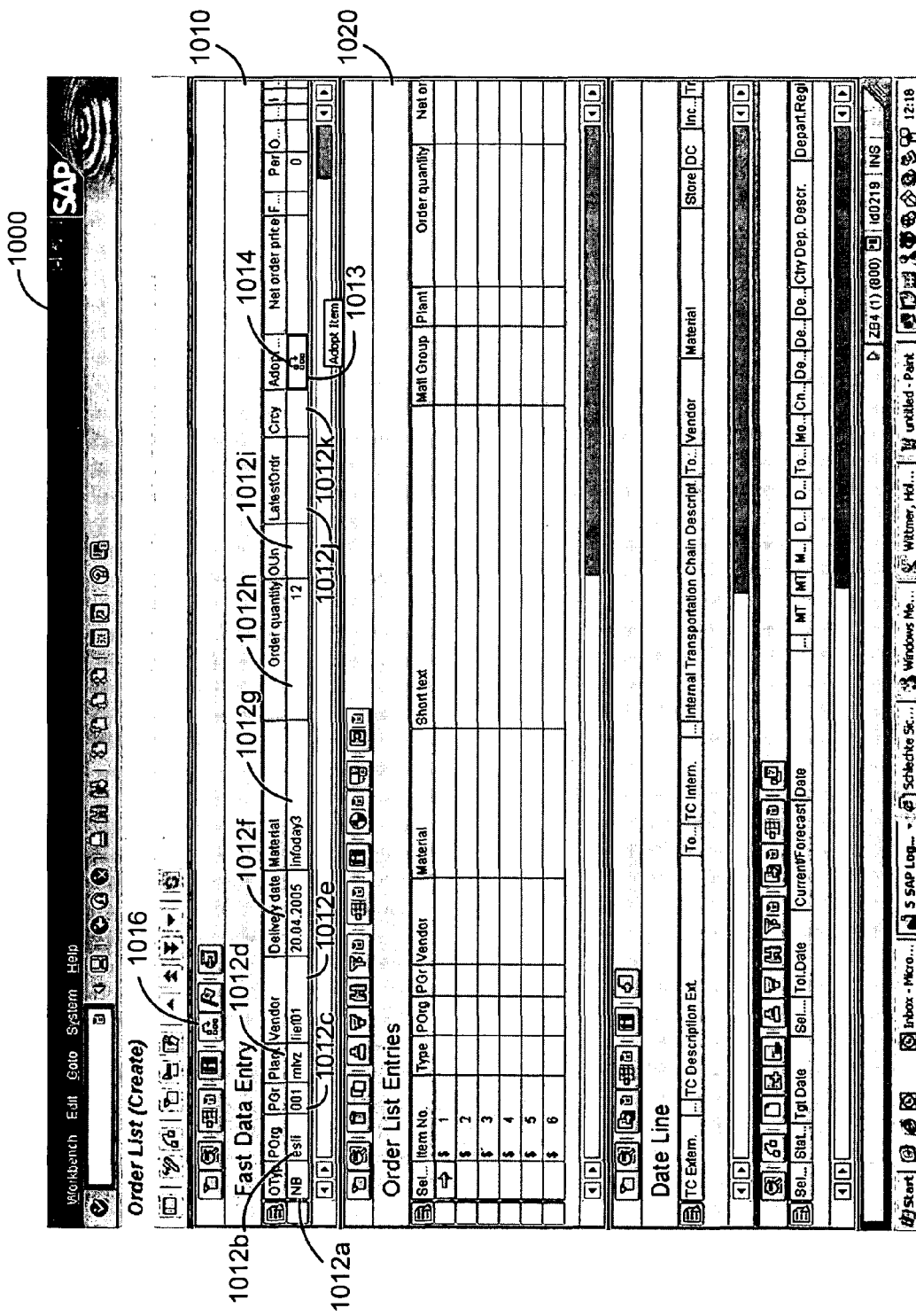
FIG. 1 illustrates a graphical user interface screen configured to facilitate manual data entry for single or multiple purchase order list line items according to an exemplary embodiment.

FIG. 1 illustrates a graphical user interface screen 1000 for use with a purchasing system and configured to facilitate manual data entry for single or multiple purchase order list line items according to an exemplary embodiment. In the illustrated embodiment, screen 1000 includes a screen area 1010 for data entry and a screen area 1020 for displaying the resultant purchase order list line items. In screen area 1010, a user may manually enter relevant data in one or more data entry fields 1012 for a particular purchase order list line item using a keyboard or other data entry device. For example, in the illustrated embodiment, screen area 1010 includes data entry fields 1012a-1012k and a cursor 1013 that allow the user to respectively enter an organization type, a purchasing organization, a purchasing group, a plant, a vendor, a delivery date, a material, an order quantity, a unit of measure, a latest order date, and a currency associated with a particular purchase order list line item.

Once the user has entered data for the desired data entry fields 1012, the user may transfer the data entered in screen area 1010 to screen area 1020 in order to adopt the data as a purchase order list line item and display the resulting information. According to an exemplary embodiment, the user can transfer the data entered in screen area 1010 to screen area 1020 by providing a single user input command (e.g., depressing an enter key on a keyboard or using a single mouse click). According to another exemplary embodiment, screen area 1010 is configured to allow the user to navigate among data entry fields 1012, enter the relevant data, and transfer the data as a purchase order list line item using only the keyboard or other data entry device without having to switch between data entry devices (e.g., without having to switch between a keyboard and a mouse). For example, in the illustrated embodiment, the user may use a keyboard to move cursor 1013 over each desired data entry field 1012 and enter the relevant data. Once the user has entered data for the desired data entry fields 1012, the user can transfer the data entered in screen area 1010 to screen area 1020 by using the keyboard to move cursor 1013 over a screen area 1014 (e.g., an icon, "button," etc.) and then depressing a key on the keyboard to select screen area 1014. According to another exemplary embodiment, the user may use a keyboard to move cursor 1013 over each desired data entry field 1012 and enter the relevant data, and then use a mouse to select a button or icon 1016 to transfer the data entered in screen area 1010 to screen area 1020.

Figure 2:
FIG. 2 illustrates the graphical user interface screen of FIG. 1 after data entered for an item has been transferred for display as a purchase order list line item according to an exemplary embodiment.

FIG. 2 illustrates graphical user interface screen 1000 after data entered in screen area 1010 has been transferred to screen area 1020 for display as a purchase order list line item in response to a user input command according to an exemplary embodiment. As shown in FIG. 2, the data entered for the item in data entry fields 1012 of screen area 1010 has been transferred and displayed in a corresponding display area in screen area 1020 as purchase order list line item number 1 in response to a user input command.

In addition to the data entered by the user in screen area 1010, additional data may be displayed in screen area 1020 for the purchase order list line item based on the data entered for the line item in screen area 1010 according to various exemplary embodiments. Such additional data may include, by way of example, data related to the item and that has previously been entered into the purchasing system. For example, as shown in FIG. 2, a short description and a material group for the item are displayed in a respective display areas 1024 and 1026. Such additional data may also include one or more parameters related to the item that may be determined from the data entered for the line item in screen area 1010 or other data related to the item that has previously been entered into the purchasing system. For example, as shown in FIG. 2, a display area 1028 is provided for displaying a net order price for the item calculated from data entered for the line item in screen area 1010 or other data related to the item. Other exemplary types of parameters determined for the item may include a vendor, a delivery date, a purchase order date, or the like.

In embodiments where additional data is provided, the additional data may be determined and displayed in response to the same user input command used to transfer the data entered in screen area 1010 to screen area 1020. For example, with reference to FIG. 2, a single user input command (e.g., depressing an enter key on a keyboard or using a single mouse click) may be used to transfer the data entered for the item in data entry fields 1012 of screen area 1010 to corresponding display areas in screen area 1020 as purchase order list line item number 1, to display the short description and material group for the item in respective display areas 1024 and 1026, and to calculate and display a net order price for the item in display area 1028, all at once.

According to another exemplary embodiment, the same user input command used to transfer the data entered in screen area 1010 to screen area 1020 may also be used to return cursor 1013 to a predetermined one of the data entry fields. For example, as shown in FIG. 2, cursor 1013 may be returned to data entry field 1012g from screen area 1014 in response to the same single user input command used to transfer the data entered for the item in data entry fields 1012 of screen area 1010 to corresponding display areas in screen area 1020 as purchase order list line item number 1.

Figure 3:
FIG. 3 illustrates the graphical user interface screen of FIG. 1 after data entered for another item has been transferred for display as a purchase order list line item according to an exemplary embodiment.

FIG. 3 illustrates graphical user interface screen 1000 after data entered in screen area 1010 for a second item has been transferred to screen area 1020 for display as a second purchase order list line item according to an exemplary embodiment. In this embodiment, data entered for each subsequent item may be transferred from screen area 1010 to screen area 1020 and displayed as a new purchase order list line item in a position ahead of each previously entered purchase order list line item in the purchase order list in response to the same user input command. For example, as shown in FIG. 3, the data entered for the second item in data entry fields 1012 of screen area 1010 (shown in FIG. 1) has been transferred and displayed in a corresponding display area in screen area 1020 as purchase order list line item number 2 directly above the data previously entered, transferred, and displayed for purchase order list line item 1, which moves downward in the list. As each new purchase order list line item is displayed, it may be added directly above the previous purchase order list line items, which move downward in the list visible in screen area 1020. According to various other exemplary embodiments, the data entered for each subsequent item may be transferred from screen area 1010 to screen area 1020 and displayed as a new purchase order list line item in various other positions ahead of the previous purchase order list line items, (e.g., ahead of and directly below the previous purchase order list line items, where the previous purchase order list line items move upward in the list visible in screen area 1020; ahead of and directly to the left or right of the previous purchase order list line items, where the previous purchase order list line items move to the right or left respectively in the list visible in screen area 1020; etc.).

Figure 4:
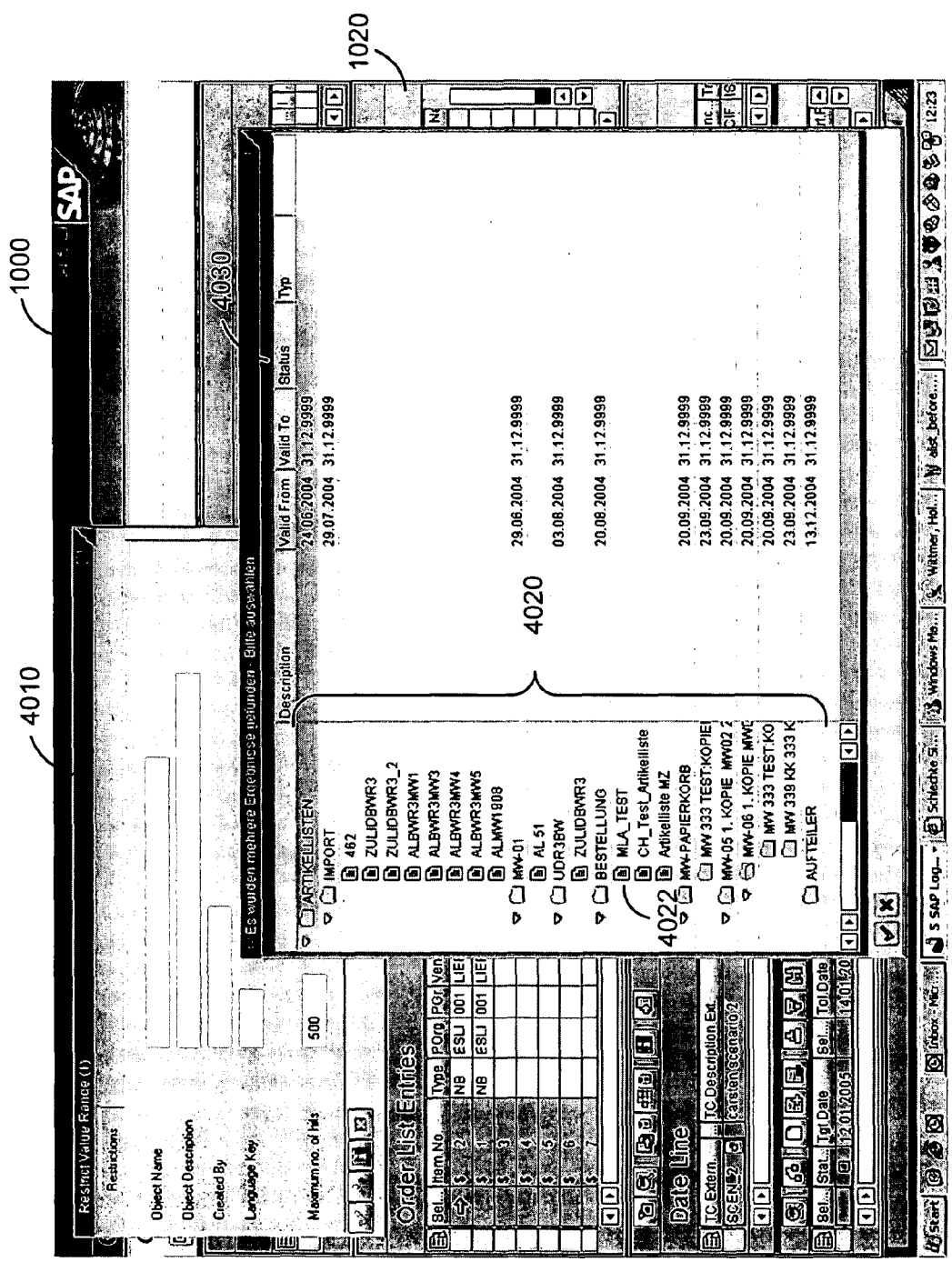
FIG. 4 illustrates manual data entry for single or multiple purchase order list line items using predetermined lists of items accessible via the graphical user interface screen of FIG. 1 according to an exemplary embodiment.

FIG. 4 illustrates manual data entry for single or multiple purchase order list line items using predetermined lists of items accessible via graphical user interface screen 1000 according to an exemplary embodiment. The predetermined lists of items may be used as an alternative to entering data for an item into the data entry fields 1012 shown in FIG. 1 (e.g., using a keyboard), and allows the user to transfer data for single or multiple items with a single user input command. Each predetermined list of items may represent a selection of items grouped according to one or more item characteristics. For example, a particular predetermined list of items may represent a preselected package of men's or women's clothing articles used by a fashion retailer.

As shown in FIG. 4, the user may call a screen 4010 that allows the user to enter one or more selection criteria used to retrieve a listing of available predetermined lists of items that meet the selection criteria. The resulting listing of predetermined lists of items may then be displayed to the user. For example, as shown in FIG. 4, a resulting listing of predetermined lists of items 4020 is displayed to the user via a screen 4030, in which the predetermined lists of items are displayed hierarchically. From the resulting listing of predetermined lists of items 4020, the user may select a particular predetermined list of items, such as predetermined list of items 4022 shown in FIG. 4.

Figure 5:
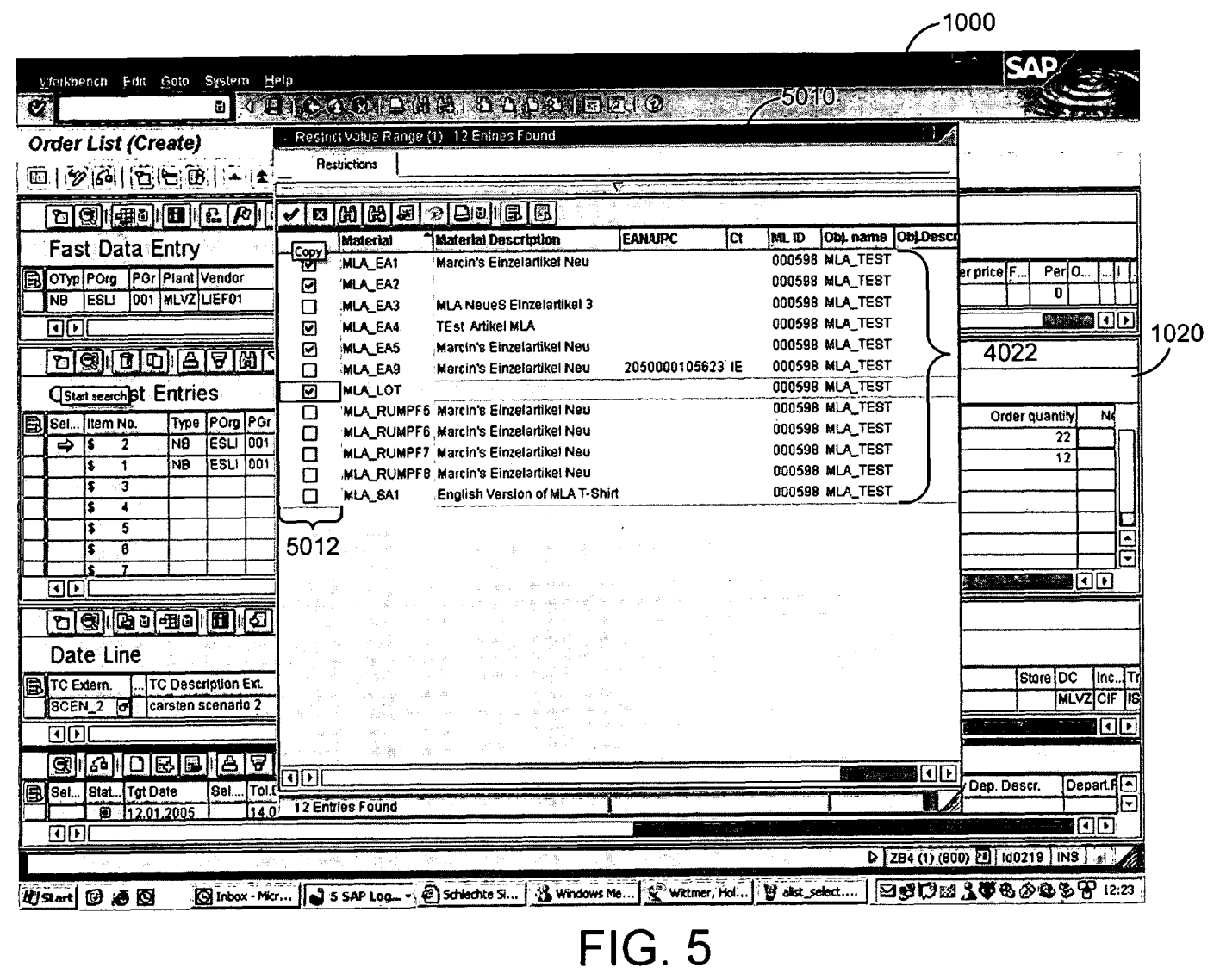

FIG. 5 illustrates a screen 5010 configured to facilitate selection of single or multiple items for manual data entry from predetermined list of items 4022 according to an exemplary embodiment. As shown in FIG. 5, screen 5010 displays each of the items in predetermined list of items 4022, and may also display data associated with each item. For example, screen 5010 may display a material, a material description, a UPC code, etc. for each item if this information is available.

The user may select one or more of the items in predetermined list of items 4022 to be added as a purchase order list line item via a user input command such as a mouse click, etc. For example, in the embodiment of FIG. 5, the user may select one or more of the items in predetermined list of items 4022 to be added as a purchase order list line item in screen area 1020 by "checking" a checkbox 5012 displayed adjacent to each item. As shown in FIG. 5, five of the items have been selected to be added as a purchase order list line item in screen area 1020.

Once the user has selected the items to be added as purchase order list line items, the user may transfer the items in order to adopt the data as a purchase order list line item and display the resulting information. For example, in the illustrated embodiment, the user may transfer the data for each item selected from predetermined list of items 4022 in screen 5010 to screen area 1020 for display as one or more purchase order list line items. According to an exemplary embodiment, the user can transfer the data for each item selected from predetermined list of items 4022 in screen 5010 to screen area 1020 by providing a single user input command (e.g., using a single mouse click depressing an enter key on a keyboard). According to another exemplary embodiment, the user may select items from predetermined list of items 4022 in screen 5010 and transfer the data as one or more purchase order list line items using only a mouse or other data entry device without having to switch between data entry devices (e.g., without having to switch between a keyboard and a mouse). For example, in the illustrated embodiment, the user may use a mouse to select one or more of the items in predetermined list of items 4022 to be added as a purchase order list line item in screen area 1020 by "checking" a checkbox displayed adjacent to each item, and then use the mouse to select a button or icon to transfer the data for each selected item to screen area 1020.

Figure 6:
FIG. 6 illustrates the graphical user interface screen of FIG. 1 after data for items selected from the screen of FIG. 5 has been transferred for display as purchase order list line items according to an exemplary embodiment.

FIG. 6 illustrates graphical user interface screen 1000 after data for items selected from predetermined list of items 4022 has been transferred to screen area 1020 for display as purchase order list line items according to an exemplary embodiment. As shown in FIG. 6, the data for each of the five items selected from predetermined list of items 4022 in screen 5010 (shown in FIG. 5) to screen area 1020 has been transferred and displayed in a corresponding display area in screen area 1020 as purchase order list line items 3-7 in response to a user input command.

Additional data may also be displayed in screen area 1020 for the purchase order list line items based on the data transferred for the items selected from predetermined list of items 4022 according to various exemplary embodiments. Such additional data may include, by way of example, data related to the item and that has previously been entered into the purchasing system. Such additional data may also include one or more parameters related to the item that may be determined from the data the data transferred for the items selected from predetermined list of items 4022 or other data related to the item that has previously been entered into the purchasing system. For example, as shown in FIG. 6, a display area 1028 is provided for displaying a net order price for the item calculated from the data transferred for the items selected from predetermined list of items 4022 or other data related to the item. Other exemplary types of parameters determined for the item may include a vendor, a delivery date, a purchase order date, or the like.

In embodiments where additional data is provided, the additional data may be determined and displayed in response to the same user input command used to transfer the data for the items selected from predetermined list of items 4022 to screen area 1020. For example, with reference to FIG. 6, a single user input command (e.g., using a single mouse click or depressing an enter key on a keyboard) may be used to transfer the data for the items selected from predetermined list of items 4022 to corresponding display areas in screen area 1020 as purchase order list line items, to display additional related data for the item, and to calculate and display a net order price for the item in display area 1028, all at once.

According to an exemplary embodiment, data for items selected from predetermined list of items 4022 and transferred to screen area 1020 for display as one or more purchase order list line items may be displayed as a new purchase order list line item or items in a position or positions ahead of each previously entered purchase order list line item in the purchase order list in response to the same user input command. For example, as shown in FIG. 6, the data for the five items selected from predetermined list of items 4022 in screen 5010 and transferred to screen area 1020 for display as purchase order list line items has been transferred and displayed in corresponding display areas in screen area 1020 as purchase order list line items 3-7 directly above the data previously entered, transferred, and displayed for purchase order list line item 1, which moves downward in the list. As each new purchase order list line item is displayed, it may be added directly above the previous purchase order list line items, which move downward in the list visible in screen area 1020. According to various other exemplary embodiments, the data entered for each subsequent item may be transferred to screen area 1020 and displayed as a new purchase order list line item in various other positions ahead of the previous purchase order list line items, (e.g., ahead of and directly below the previous purchase order list line items, where the previous purchase order list line items move upward in the list visible in screen area 1020; ahead of and directly to the left or right of the previous purchase order list line items, where the previous purchase order list line items move to the right or left respectively in the list visible in screen area 1020; etc.).

In this way, the method and system for purchase order data entry may provide more efficient manual entry of purchase order data. The method and system may reduce the amount of manual and repetitive copying of previously entered data required to generate a purchase order and allow the user to enter data for large numbers of items more efficiently using a single input command. The method and system may further require minimize changes between data entry devices (e.g., switching between keyboard and mouse) for entry of purchase order data, and may also reduce the number of user input commands for entry of purchase order data.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The methods described herein may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The method and system in some embodiments may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The method and system may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the system might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method of entering purchase order data, comprising:
   determining one or more predetermined lists of items satisfying a selection criteria entered by the user using a graphical user interface associated with a computerized purchasing system;
   displaying hierarchically the one or more predetermined lists of items;
   receiving a selection by the user of a first predetermined list of items from the one or more predetermined lists of items;
   displaying one or more items associated with the first predetermined list of items including a set of data for each item previously entered into the computerized purchasing system;
   receiving first data associated with an item selected by the user from the first predetermined list of items, wherein the first data comprises data entered by a user using the graphical user interface associated with the computerized purchasing system;
   transferring the first data to a purchase order list in response to a single user input command facilitated by the graphical user interface; and
   displaying the first data as a purchase order list line item in the purchase order list in response to the single user input command;
   determining whether a material, a material description, and a UPC code are available for the item based on the first data;
   displaying the material in the purchase order list line item based on a material availability, the material previously entered into the purchasing system;
   determining a material description display decision which is that a material description should be displayed;
   displaying the material description in the purchase order list line item based on the material description display decision, the material description previously entered into the purchasing system;
   displaying the UPC code in the purchase order list line item based on a UPC code availability, the UPC code previously entered into the purchasing system;
   generating a net order price for the item based on the first data;
   displaying the net order price for the item;
   wherein a processor is configured to display the purchase order list line item in at least one of a first position ahead of a previously transferred purchase order list line item in the purchase order list, a second position below the previously transferred purchase order list line item in the purchase order list, a third position ahead of and to the left of the previously transferred purchase order list line item in the purchase order list, and a fourth position ahead of and to the right of the previously transferred purchase order list line item in the purchase order list.

2. The method of claim 1, wherein the graphical user interface comprises a first screen area configured to facilitate receiving the first data, and a second screen area configured to facilitate displaying the first data and data relating to a vendor, a delivery date, and a purchase order date; and
   wherein the first screen area comprises data entry fields and a cursor configured to allow the user to navigate among the data entry fields in order to enter the first data.

3. The method of claim 2, further comprising returning the cursor to a predetermined first one of the data entry fields in response to the single user input command.

4. The method of claim 2, wherein receiving the first data comprises receiving data entered by a user using the graphical user interface and one of a keyboard and a mouse; and
   wherein transferring the first data to the purchase order list in response to the single user input command comprises transferring the first data in response to receiving the single user input command from the one of the keyboard and the mouse.

5. A purchasing system, comprising:
   means for determining one or more predetermined lists of items satisfying a selection criteria entered by the user using a graphical user interface associated with a computerized purchasing system;
   means for displaying hierarchically the one or more predetermined lists of items;
   means for receiving a selection by the user of a first predetermined list of items from the one or more predetermined lists of items;
   means for displaying one or more items associated with the first predetermined list of items including a set of data for each item previously entered into the computerized purchasing system;
   means for receiving first data associated with an item selected by the user from the first predetermined list of items, wherein the first data comprises data entered by a user using the graphical user interface associated with the computerized purchasing system;
   means for transferring the first data to a purchase order list in response to a single user input command facilitated by the graphical user interface; and
   means for displaying the first data as a purchase order list line item in the purchase order list in response to the single user input command;
   means for determining whether a material, a material description, and a UPC code are available for the item based on the first data;
   means for displaying the material based on a material availability;
   means for determining a material description display decision which is that a material description should be displayed;
   means for displaying the material description in the purchase order list line item based on the material description display decision, the material description previously entered into the purchasing system;
   means for displaying the UPC code in the purchase order list line item based on a UPC code availability, the UPC code previously entered into the purchasing system;
   means for generating a net order price for the item based on the first data;
   means for displaying the net order price for the item;
   wherein a processor is configured to display the purchase order list line item in at least one of a first position ahead of a previously transferred purchase order list line item in the purchase order list, a second position below the previously transferred purchase order list line item in the purchase order list, a third position ahead of and to the left of the previously transferred purchase order list line item in the purchase order list, and a fourth position ahead of and to the right of the previously transferred purchase order list line item in the purchase order list.

6. The system of claim 5, wherein the graphical user interface comprises a first screen area configured to facilitate receiving the first data, and a second screen area configured to facilitate displaying the first data and data relating to a vendor, a delivery date, and a purchase order date; and wherein the first screen area comprises data entry fields and a cursor configured to allow the user to navigate among the data entry fields in order to enter the first data.

7. The system of claim 6, further comprising means for returning the cursor to a predetermined first one of the data entry fields in response to the single user input command.

8. The system of claim 6 wherein the means for receiving the first data is configured to receive data entered by a user using the graphical user interface and one of a keyboard and a mouse; and wherein the means for transferring the first data to the purchase order list in response to the single user input command is configured to transfer the first data in response to receiving the single user input command from the one of the keyboard and the mouse.

9. A program product for facilitating purchase order data entry, the program product comprising machine-readable program code for causing, when executed, one or more machines to perform the following method steps:

determining one or more predetermined lists of items satisfying a selection criteria entered by the user using a graphical user interface associated with a computerized purchasing system;

displaying hierarchically the one or more predetermined lists of items;

receiving a selection by the user of a first predetermined list of items from the one or more predetermined lists of items;

displaying one or more items associated with the first predetermined list of items including a set of data for each item previously entered into the computerized purchasing system;

receiving first data associated with an item selected by the user from the first predetermined list of items, wherein the first data comprises data entered by a user using the graphical user interface associated with the computerized purchasing system;

transferring the first data to a purchase order list in response to a single user input command facilitated by the graphical user interface; and displaying the first data as a purchase order list line item in the purchase order list in response to the single user input command;

determining whether a material, a material description, and a UPC code are available for the item based on the first data;

displaying the material in the purchase order list line item based on a material availability, the material previously entered into the purchasing system;

determining a material description display decision which is that a material description should be displayed;

displaying the material description in the purchase order list line item based on the material description display decision, the material description previously entered into the purchasing system;

displaying the UPC code in the purchase order list line item based on a UPC code availability, the UPC code previously entered into the purchasing system;

generating a net order price for the item based on the first data;

displaying the net order price for the item;

wherein a processor is configured to display the purchase order list line item in at least one of a first position ahead of a previously transferred purchase order list line item in the purchase order list, a second position below the previously transferred purchase order list line item in the purchase order list, a third position ahead of and to the left of the previously transferred purchase order list line item in the purchase order list, and a fourth position ahead of and to the right of the previously transferred purchase order list line item in the purchase order list.

10. The program product of claim 9, wherein the graphical user interface comprises a first screen area configured to facilitate receiving the first data, and a second screen area configured to facilitate displaying the first data and data relating to a vendor, a delivery date, and a purchase order date; and wherein the first screen area comprises data entry fields and a cursor configured to allow the user to navigate among the data entry fields in order to enter the first data.

11. The program product of claim 10, wherein the machine-readable program code is further configured to cause, when executed, the one or more machines to perform the following method step:

returning the cursor to a predetermined first one of the data entry fields in response to the single user input command.

12. The program product of claim 10, wherein receiving the first data comprises receiving data entered by a user using the graphical user interface and one of a keyboard and a mouse; and wherein transferring the first data to the purchase order list in response to the single user input command comprises transferring the first data in response to receiving the single user input command from the one of the keyboard and the mouse.

* * * * *